(12) United States Patent
Kelly et al.

(10) Patent No.: US 10,068,447 B1
(45) Date of Patent: Sep. 4, 2018

(54) LIGHTING MODULE WITH INTEGRATED SENSING

(75) Inventors: Timothy Kelly, Brookline, MA (US); Terence Yeo, Boston, MA (US)

(73) Assignee: Fusion Optix, Inc., Woburn, MA (US)

( * ) Notice: Subject to any disclaimer, the term of this patent is extended or adjusted under 35 U.S.C. 154(b) by 338 days.

(21) Appl. No.: 13/436,895

(22) Filed: Mar. 31, 2012

Related U.S. Application Data

(60) Provisional application No. 61/469,870, filed on Mar. 31, 2011, provisional application No. 61/553,943, filed on Oct. 31, 2011.

(51) Int. Cl.
*G08B 13/189* (2006.01)
*G08B 13/19* (2006.01)
*G08B 13/191* (2006.01)
*G08B 13/193* (2006.01)

(52) U.S. Cl.
CPC .......... *G08B 13/189* (2013.01); *G08B 13/19* (2013.01); *G08B 13/191* (2013.01); *G08B 13/193* (2013.01)

(58) Field of Classification Search
CPC .... G08B 13/19; G08B 13/193; G08B 13/189; G08B 13/191; Y10S 250/01
USPC ........................................................ 250/342
See application file for complete search history.

(56) References Cited

U.S. PATENT DOCUMENTS

| | | | | |
|---|---|---|---|---|
| 4,746,770 A | * | 5/1988 | McAvinney | 178/18.09 |
| 6,806,474 B2 | * | 10/2004 | McGregor et al. | 250/393 |
| 8,138,479 B2 | * | 3/2012 | Kothari et al. | 250/353 |
| 2009/0194670 A1 | * | 8/2009 | Rains et al. | 250/205 |
| 2010/0208980 A1 | * | 8/2010 | Urban et al. | 382/149 |

* cited by examiner

*Primary Examiner* — David Porta
*Assistant Examiner* — Mindy Vu

(57) ABSTRACT

Light emitting modules are provided in which light emission and sensing functions are integrated into a single module. Example embodiments utilize a non-planar light guide to create a cavity within which sensing components are configured. Some embodiments provide for collection of directional information regarding light incident to the lighting module.

18 Claims, 7 Drawing Sheets

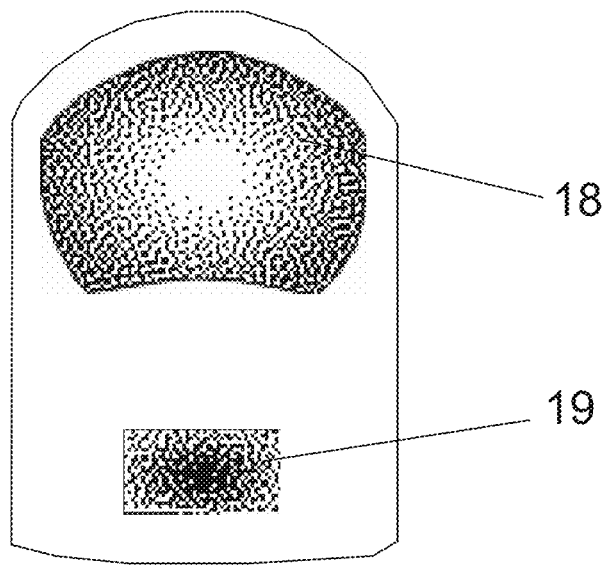
Figure 7: Prior Art
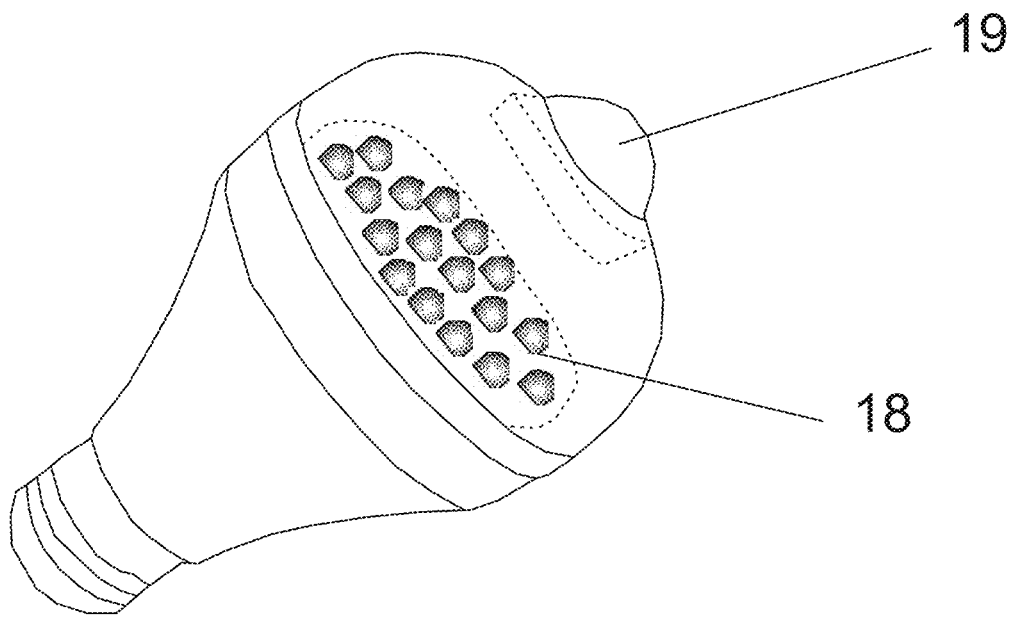
Figure 8: Prior Art

LIGHTING MODULE WITH INTEGRATED SENSING

RELATED APPLICATIONS

This application claims the benefit of provisional patent application Ser. No. 61/469,870 titled "Lighting Module with Integrated Optical Sensing" filed Mar. 31, 2011 and Ser. No. 61/553,943 titled "Lighting Module with Integrated Sensing" filed Oct. 31, 2011 by the present inventors.

FIELD OF THE INVENTION

This invention generally relates to light emitting devices comprising optical components for illumination.

BACKGROUND

The present invention relates generally to lighting devices with integrated sensing of electromagnetic radiation. In such systems it is generally desirable but challenging to keep light emitting and sensing components closely integrated but functionally isolated so sensing components do not sense emitted light and sensing components do not block desired light emission.

Examples of lighting devices and systems combined with sensing devices can be found in prior art such as U.S. Pat. No. 7,583,901 (Nakagawa et al.) which discloses illuminative light communication devices and also in U.S. Pat. No. 6,222,191 (Myron, et. al) which discloses occupancy sensors. Some embodiments of lighting modules and devices utilize arcuate outcoupling optics example of which are described in U.S. application Ser. Nos. 12/403,366 and 12/762,253 by Coleman et. al.

SUMMARY

Light emitting modules are provided in which light emission and sensing functions are integrated into a single module. Example embodiments utilize a non-planar light guide to create a cavity within which sensing components are configured. Some embodiments provide for collection of directional information regarding light incident to the lighting module.

BRIEF DESCRIPTION OF THE DRAWINGS

FIG. 7 is Prior Art showing a LED light fixture with sensor.

FIG. 8 is Prior Art showing a LED light fixture with sensor.

DETAILED DESCRIPTION

Figure 1:
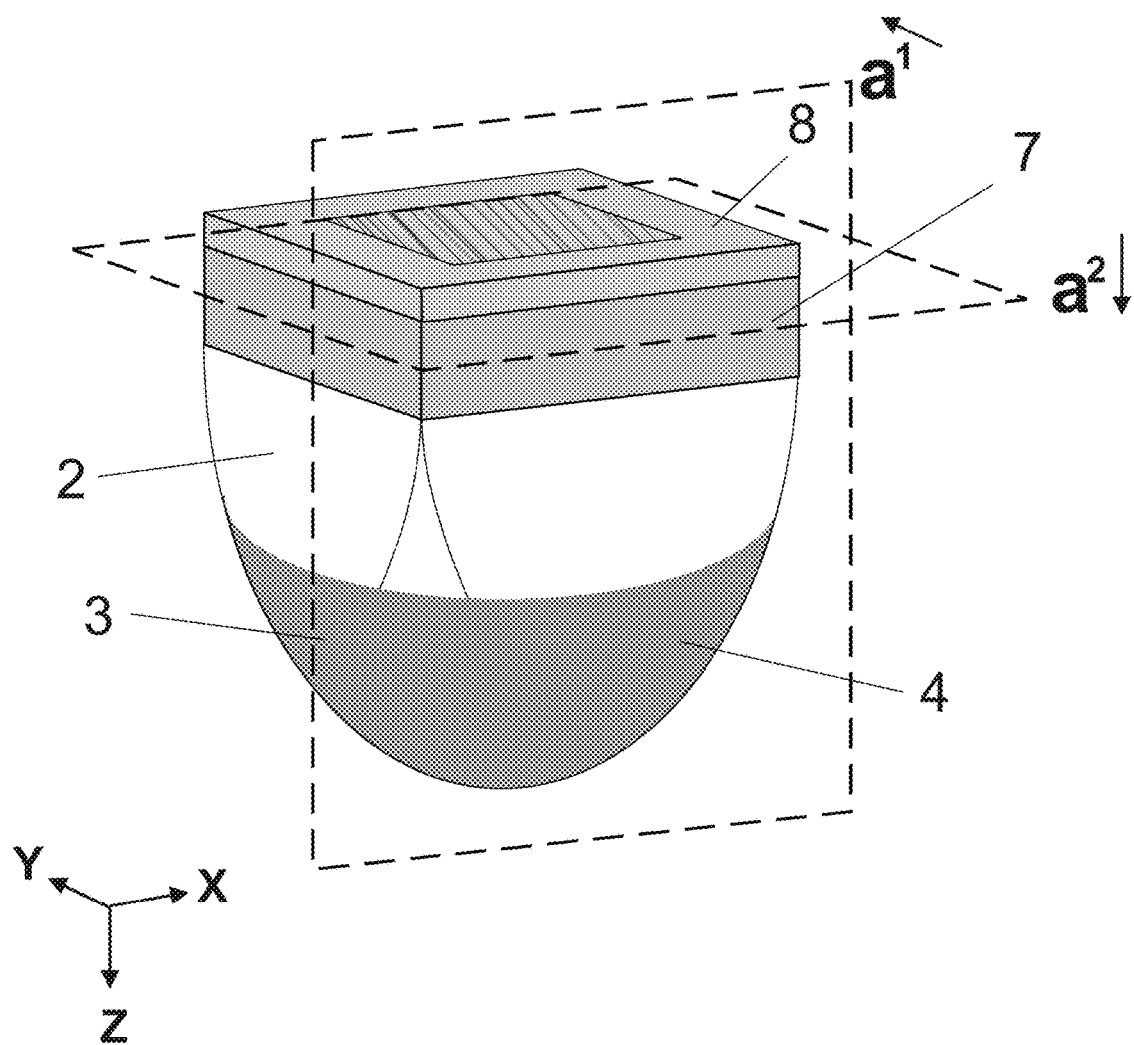
FIG. 1 is perspective view of a LED module with outcoupling optic.

Embodiments of the invention are shown that provide a LED module having integration of an illuminative lighting system and a sensing optical system which function in tandem with optical paths independent enough to allow effective functioning of both illumination and sensing functions. The module provides in many varying applications benefits in simplified design and lower overall system cost, compact device size, improved aesthetics, and increased light emitting area. Embodiments of the invention may utilize optical sensors that function within any portion of the electromagnetic spectrum. One benefit of the invention is that it provides for an integrated illumination and optical sensing system. Typical existing system solutions require optical sensors to be mounted outside of the optical system the positioning of which requires a more complex solution and may deliver different sensing results depending on the specific placement and orientation of optical sensors. Also, output from the illuminative light source may interfere with accurate functioning of the optical sensor. The invention provides solutions for these problems by providing a single integrated unit from which optical sensing data can be consistently and interpreted. Some embodiments of the invention provide means for multiple independent optical sensors configured to measure at different spatial orientations. These can be used by a processing device to interpret and map the directional orientation of radiant energy incident upon the lighting module in two or three dimensions. That information can then be used to control adjustments to the output of light sources.

In operation the lighting module is supplied with input electrical power which is converted within the lighting module to appropriate current, voltage and waveforms which are distributed to individual light sources. For LED light sources, typically DC current is utilized. One or more outcoupling units distribute illuminative output light. One or more optical sensors are used to monitor radiant energy outside of the module. Control electronics adjust the output of individual light sources in response to sensor measurements. The outcoupling module can be configured as a modular unit to fit inside various lighting devices such as light fixtures or displays.

A first group of embodiments described are focused on the use of visible light sensors for detection of light levels. As one example application, ambient light sensors are commonly used to monitor the illumination of illuminated spaces and then adjust the lighting module luminous output to achieve targeted zonal lumen densities. This type of system is commonly used to maintain constant light levels over time as daylight contribution to the space rises and falls. Ambient light sensing is the name used in this application to categorize these types of applications.

A second group of embodiments described are focused on the use of infrared light sensors for occupancy sensing. As an example of one common application, infrared sensors are used to detect the presence of people which serves to turn on lights that otherwise remain in a dormant off state to conserve energy. Occupancy sensing is the name used in this application to categorize these types of applications. In addition to the two embodiment groups described in detail, the invention can be applied to sensor and feedback systems that detect and act upon color characteristics of visible light.

A third group of embodiments are illuminative light communication devices. In these embodiments lighting devices communicate with each other and independent controllers by the modulation of emitted light, typically be variation of light intensity or blinking of the light source.

FIG. 7 is prior art showing a LED light fixture with sensor. In this case the lighting sub-module 18 and the sensing sub-module 19 are separately located on the device in order to avoid interaction between light emitting and sensing functions. This results in an expanded device size compared to what integrating the components can achieve.

FIG. 8 is prior art showing a LED light fixture with sensor. In this case the sensing sub-module 19 is located on top of the lighting sub-module 18. This reduces interference of emitted light on sensing but the sensor sub-module blocks emitted light, reducing optical performance and aesthetic appearance.

FIG. 1 is a perspective view of embodiment 1 of the invention. Axes x, y, and z orientations are identified along with the cross-section views $a^1$ and $a^2$. As a benefit of the invention, the presence of a sensor is not noticeable to an observer.

Figure 2:
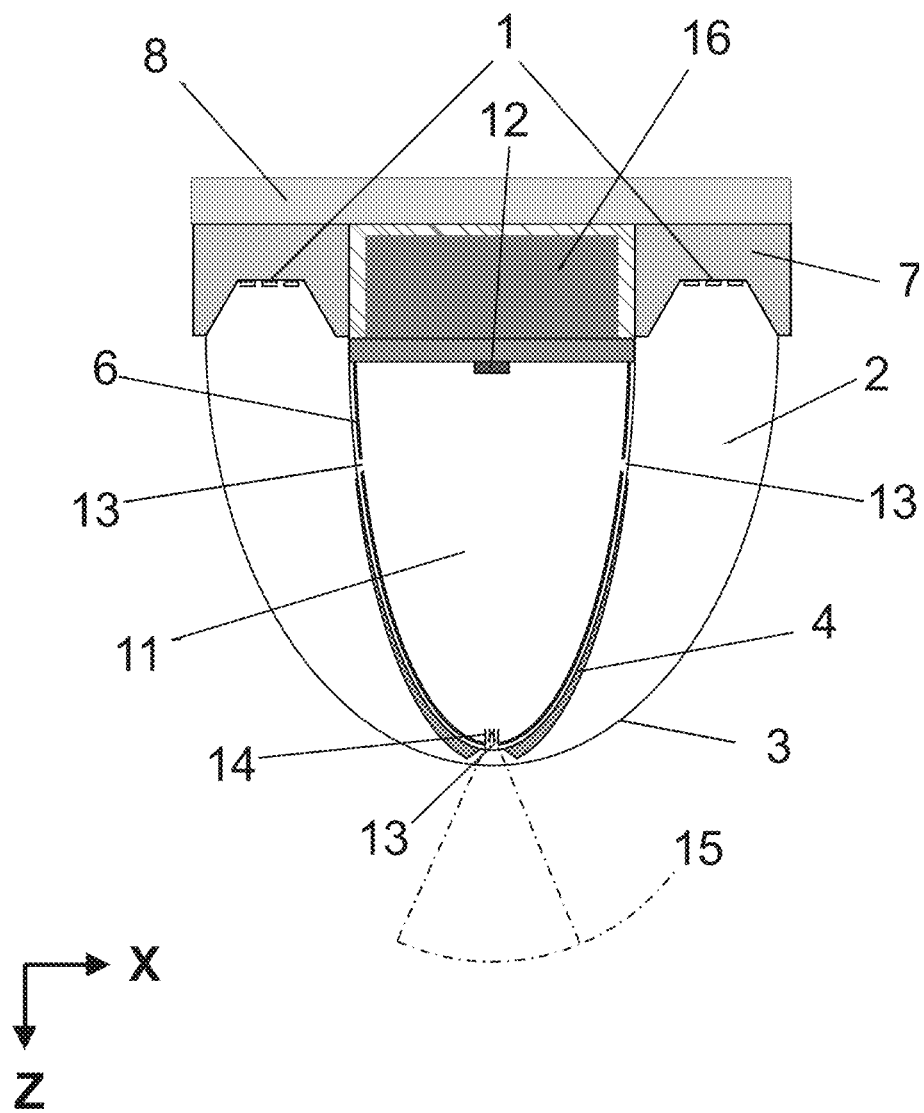
FIG. 2 is a x-z cross section view of an example embodiment with a single LED sensor and single aperture.

FIG. 2 is a x-z cross section view of an embodiment light emitting module with a single optical sensor. The sensor 12 and light source 1 operates simultaneously as light is emitted from the module. The light source 1 is contained within the packaged circuit 7 which is attached to a backing layer 8. Light from the light source 1 enters the light guide 2 where it propagates by internal reflection. The light guide comprises an optically clear region of greater than 95% clarity as measured by a Hazegard Plus optical measurement equipment sold commercially by the BYK-Gardner company. The embodiments illustrated in FIGS. 1-6 show a volumetric diffuser as an outcoupling region but other light redirecting means may be substituted. As light propagates within the light guide it intersects an outcoupling region 4 of the light guide which redirects a portion of light to the output surface 3 at an angle that exceeds the critical angle of total internal reflection to the output surface 3 causing light to be emitted from the light emitted out the output surface. An optical sensor 12 is located within the measurement cavity 11 inside the reflective dome 6 which in this embodiment is reflective on both sides. A reflectance of greater than 80% is considered reflective. The reflective dome serves as a low light transmission region which separates light output and light measurement optical paths within the module. Light transmission of less than 10% is considered low light transmission. For the surface of the low light transmission region facing the light guide 2 a diffuse reflectance of greater than 70% is typical. Apertures 13 through the outcoupling region 4 serve as entry ports into the reflective dome 6 which gathers and integrates light by multiple reflections within the reflective dome. In such an embodiment a sensor will detect a spatially averaged lumen level corresponding to spatial averaging of light incident upon the lighting module. Averaging will be more complete the larger the acceptance angle of the sensor. The position of the optical sensor inside of the reflective dome isolates it from the optical path of the outcoupling optic to prevent illuminative light input into the sensor, thereby reducing measurement error. To further restrict illuminative light from being detected by the optical sensor a louver or optic lens that adjusts the angular acceptance profile of input light can be utilized. For example, a lens or louver 14 can be used to narrow the acceptance angle 15 and restrict input to a more narrow angular range thereby eliminating low angle input from the illuminative light source which may have otherwise been included as input into the sensor. FIG. 2 details the outcoupling region as being on the interior side of the light guide 2 but other embodiments could be have outcoupling regions anywhere in or on the light guide. The apertures are optional and may or may not extend through the light guide 2, depending on particular embodiment. Typically, the aperture provides a clear line of sight through the light outcoupling zone into the reflective dome. This is an important feature if both the illuminative light source and optical sensor are activated at the same time as it serves to prevent scattered light from entering the reflective dome.

In another embodiment of the invention, the illuminative light source 1 and optical sensor 12 are cycled on and off is such a manner that the sensor only measures when the light source is off. Typically this is continuously done at a frequency 60 hz or greater in order to prevent a minimal or unnoticeable fluctuation in light output to the human eye.

Figure 3:
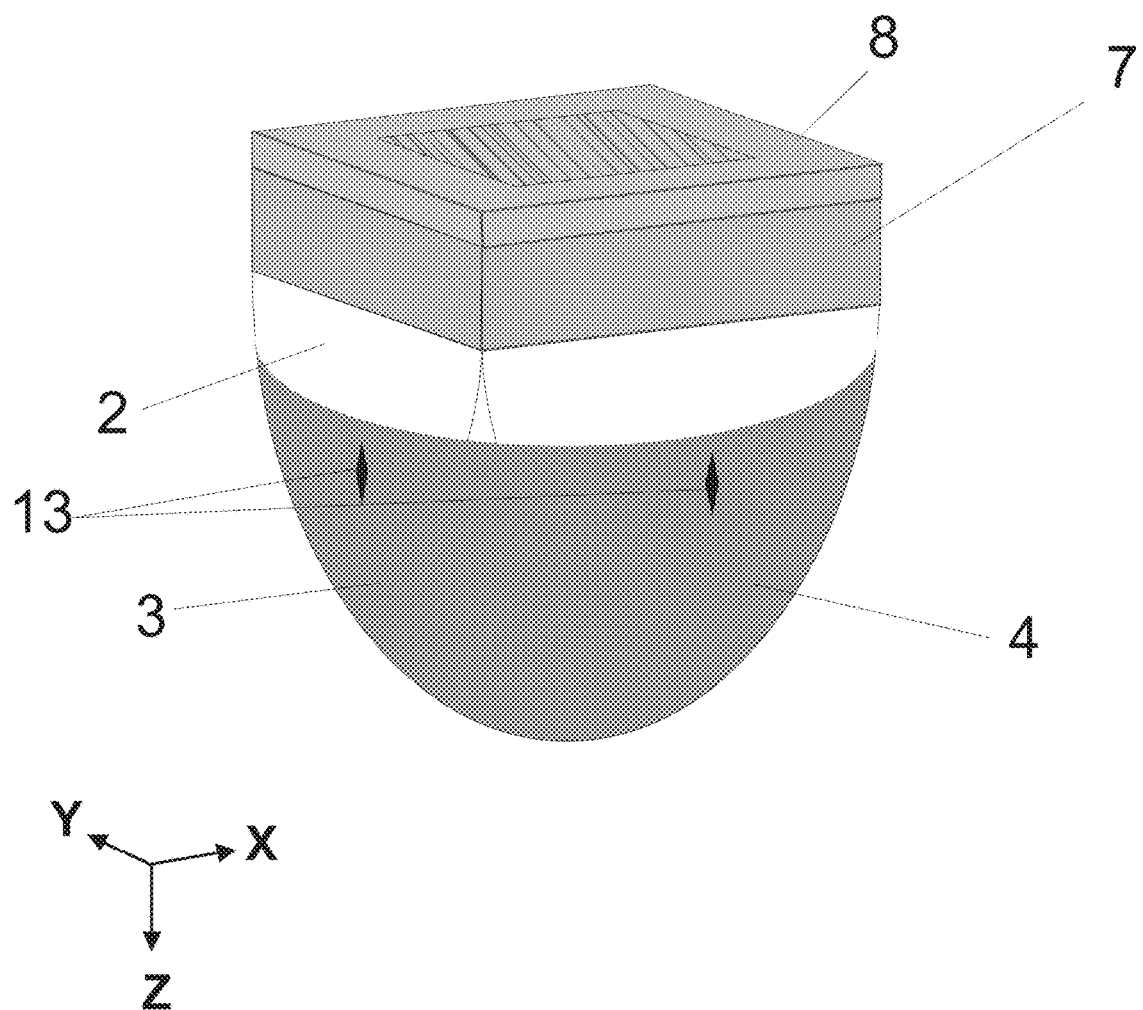
FIG. 3 is a perspective view of the exterior of an embodiment lighting module with apertures on the sides of the module.

FIG. 3 is a perspective view of the exterior of the lighting module of FIG. 2 showing an aperture 13 which has been designed to minimize optical interference of the illuminative light path by orienting an acute angle outline towards the light sources. Apertures 13 can be fabricated in acrylic with the use of a $CO_2$ laser. Optionally, the optic can be designed to rotate about the z axis in order to align the aperture with a specific orientation of interest to be measured.

Figure 4:
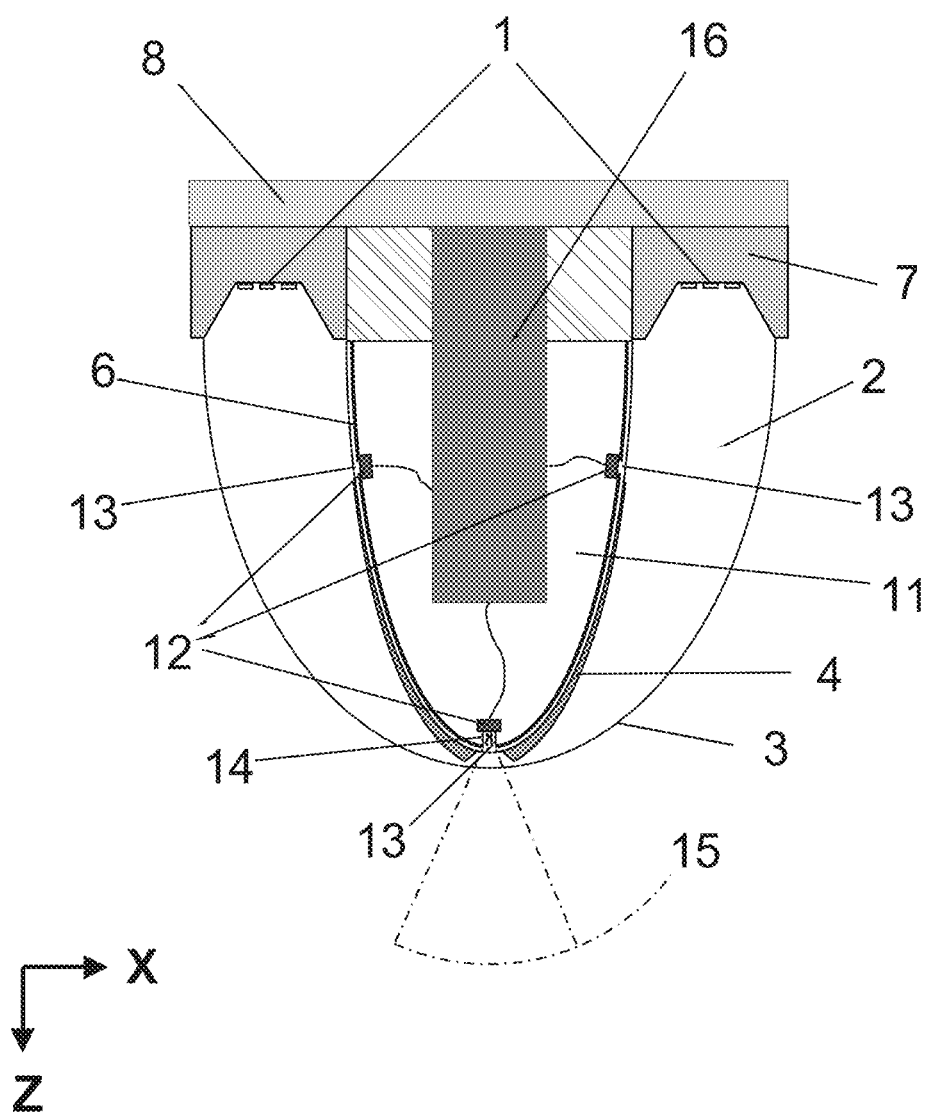
FIG. 4 shows an embodiment LED module which utilizes multiple sensors to provide independent spatially oriented signals.
Figure 5:
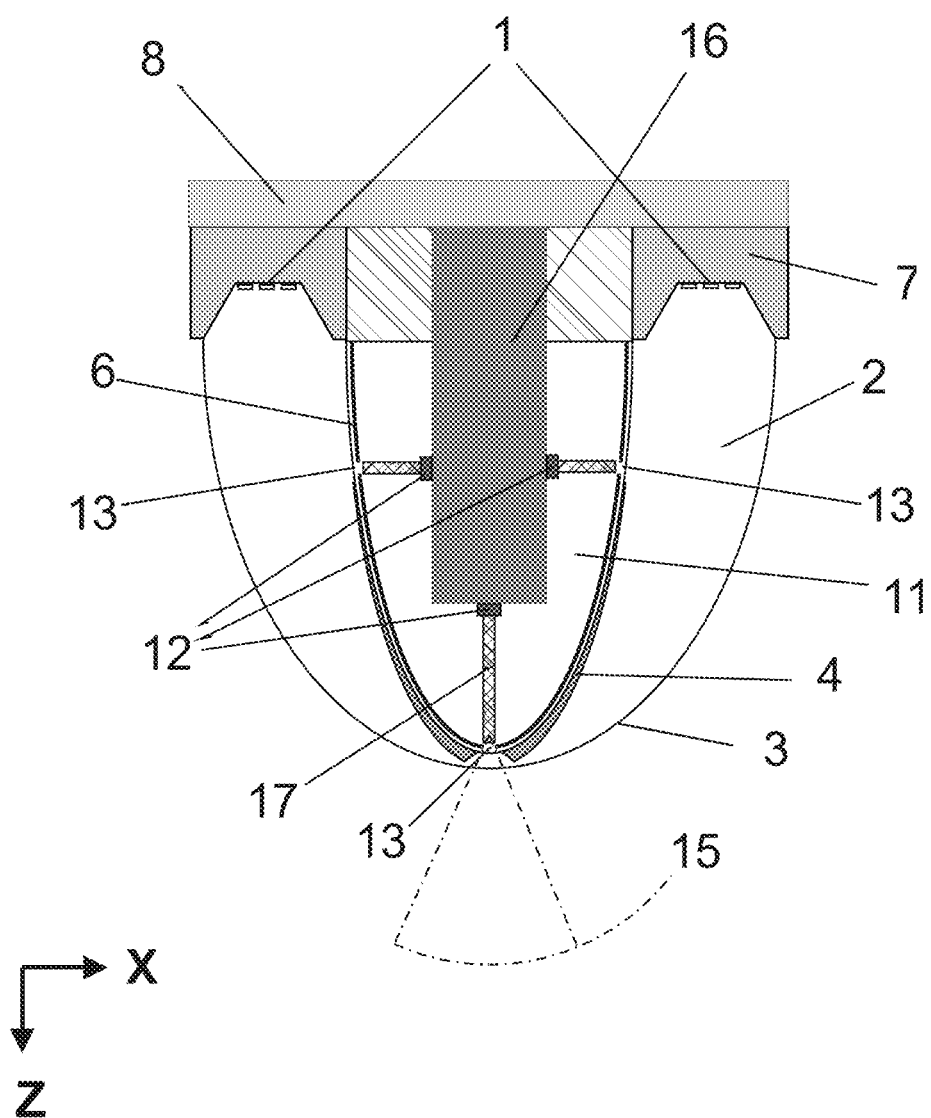
FIG. 5 shows an embodiment LED module which utilizes multiple sensors and sensor light guides to provide independent spatially oriented signals.

FIG. 4 and FIG. 5 show embodiments of the invention which utilize multiple sensors to provide independent spatially oriented signals. These can be used to provide directional and movement tracking information to a control and feedback system. Given a non-planar outcoupling optic such as a dome or bulb, the placement of apertures can be configured to allow monitoring of three dimensional space. As illustrated in FIG. 4 and FIG. 5, the extension of a non-planar optic such as a dome or bulb away from the packaged circuit can be utilized to position optical sensors in positions and orientations not feasible if they were to be mounted on the housing of conventional luminaire, for example a ceiling mounted downlight. When combined with a processing controller, the spatial mapping information generate by optical sensors of different spatial orientation can be used to make adjustments to light sources within the lighting module. For example, a lighting module can be designed such that the output of individual LEDs in a LED module can generate different light distribution outputs from the LED module. After sensing directional input from multiple photodiodes detecting visible light, a controller can be used to calculate and send power adjustments to individual LEDs to apply more light toward areas sensed as being dim.

FIG. 4 is an x-z cross section of an embodiment having sensors located at apertures in the reflective dome. The sensors are electrically connected to a controller. The sensor may include an optic that adjusts the angular acceptance profile of the sensor. For example, a louver or lens 14 can be used to narrow the acceptance angle 15 and restrict input to a more narrow angular range. This could be done with any of the aperture sites.

FIG. 5 is an x-z cross section of an embodiment having sensors located on a circuit board inside the reflective dome. Optical fibers or other lightguiding components are used as a sensor light guide 17 to deliver light from apertures to the sensors. The input tip of the sensor light guide may include an optic that adjusts the angular acceptance profile. For example, a dome lens can be used to narrow the acceptance angle 15 and restrict input to a more narrow angular range. A narrower acceptance angle 15 will reduce the amount of light emitted by the module that is received by the sensor.

This will reduce the amount of noise interfering with an intended measurement signal of light exterior of the module.

Figure 6:
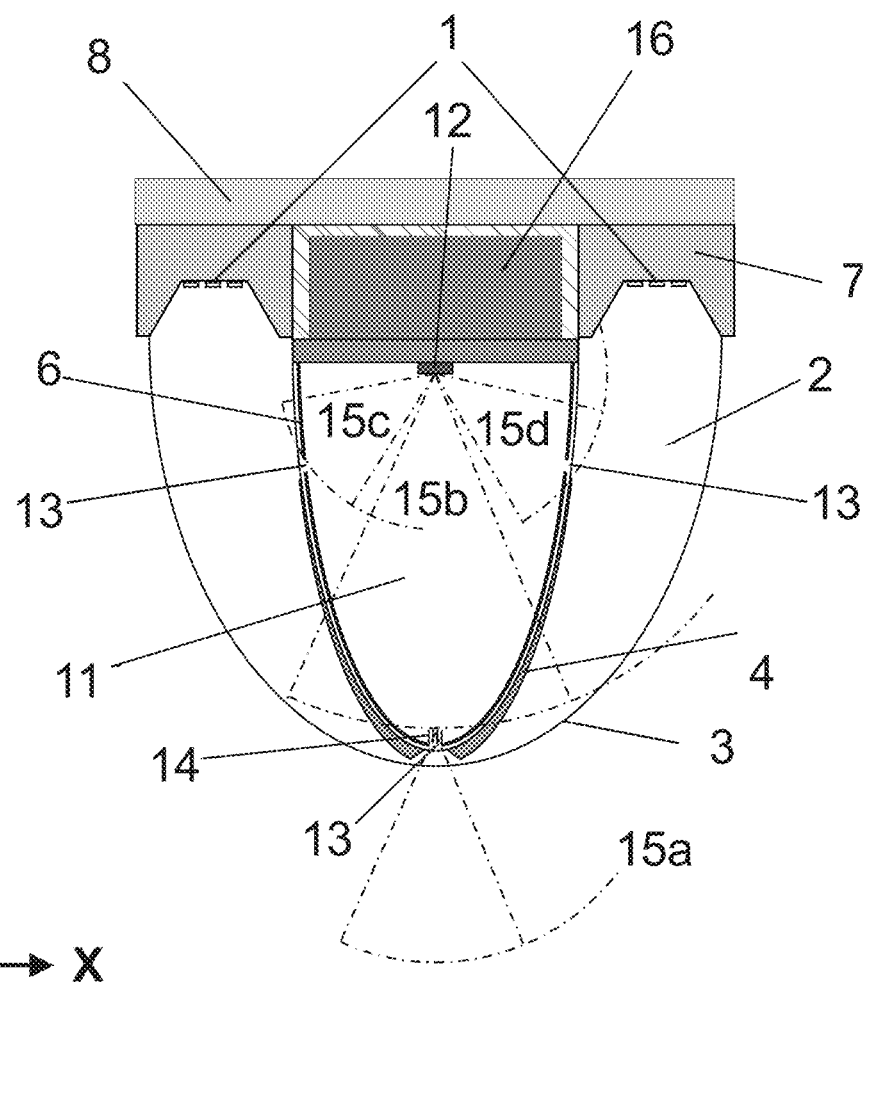
FIG. 6 is a x-z cross section view of an embodiment of the invention having an optical sensor capable of measuring different acceptance angles.

FIG. 6 is a x-z cross section view of an embodiment of the invention having an optical sensor 12 located within the measurement cavity 11 inside the reflective dome 6. The configuration is similar to the embodiment of FIG. 2 but the optical sensor has the capability to measure directional input by use of multiple independent acceptance cones 15a, 15b, 15c, and 15d. In this case the apertures can be aligned with the angular acceptance profiles of the optical sensor to relay directional information about light incident upon the lighting module. Optic lenses can be positioned at the apertures to more effectively direct light to the optical sensor. In this embodiment the inside of the reflective dome 6 can be made substantially non-reflective (<20%) in order to minimize reflection into the optical sensor and maximize the signal to noise ratio of directional measurements.

Embodiments illustrated in FIGS. 1-6 all show LED modules having non-planar light guides. Embodiments with planar light guides are also within the inventive scope of the present invention.

Embodiments of disclosed light emitting modules may be produced by known manufacturing processes. Light guides may be produced by processes such as molding, thermoforming, or hot pressing. Light sources may optionally be optically coupled to light guides by such means as optical adhesives. Outcoupling regions may be produced by laminating or insert molding volumetric diffusing films to light guides. Another example process for making an outcoupling region is to pattern the surface of a light guide with an embossing tool.

What is claimed is:

1. A light emitting module comprising:
    a) an outcoupling light guide comprising an optically clear light guide region and an outcoupling region;
    b) a first light source which inputs light into the outcoupling light guide;
    c) a low light transmission region with light transmittance of less than 10%;
    d) a measurement cavity contained by the low light transmission region and isolated from the optical path of light from the first light source;
    e) a sensor of electromagnetic radiation located within the measurement cavity and having an acceptance cone positioned to receive light transmitted through an aperture of the low transmission region;
wherein the light emitting module both emits light from the light source and senses electromagnetic radiation generated external of the module.

2. The light emitting module of claim 1 wherein the outcoupling light guide is non-planar.

3. The light emitting module of claim 2 wherein the non-planar outcoupling light guide contains the measurement cavity.

4. The light emitting module of claim 1 wherein the measurement cavity further comprises a reflective surface.

5. The light emitting module of claim 4 wherein the reflective surface is greater than 80% reflective.

6. The light emitting module of claim 1 in which the measurement cavity is within a reflective dome which serves as the low light transmission region.

7. The light emitting module of claim 1 wherein the low light transmission region has a diffuse reflectance greater than 70% on a surface facing the outcoupling light guide.

8. The light emitting module of claim 1 where multiple sensors are used to produce directional information about external light incident on the module.

9. The light emitting module of claim 1 wherein multiple acceptance cones are used to produce directional information about external light incident on the module.

10. The light emitting module of claim 1 wherein the measurement cavity comprises an inner surface with less than 20% reflectance.

11. The light emitting module of claim 1 wherein the acceptance cone of the sensor is narrowed by the use of a lens.

12. The light emitting module of claim 1 wherein the acceptance cone of the sensor is narrowed by the use of a sensor light guide.

13. The light emitting module of claim 1 wherein the acceptance cone of the sensor is narrowed by the use of a louver.

14. The light emitting module of claim 1 wherein the sensor is receptive to visible light.

15. The light emitting module of claim 1 wherein the sensor is receptive to infrared radiation.

16. The light emitting module of claim 1 wherein the light emitting module simultaneously emits light from the light source and senses electromagnetic radiation generated external of the module.

17. The light emitting module of claim 1 wherein the light source and the sensor are not simultaneously in an on state.

18. The light emitting module of claim 17 wherein the light source and sensor cycle on and off at a frequency of 60 hz or greater.

* * * * *